United States Patent [19]

Coffman

[11] Patent Number: 4,563,325
[45] Date of Patent: Jan. 7, 1986

[54] FORMING PLASTIC ARTICLES IN SOLID STATE

[75] Inventor: Paul M. Coffman, Houston, Tex.

[73] Assignee: Shell Oil Company, Houston, Tex.

[21] Appl. No.: 489,628

[22] Filed: May 20, 1983

[51] Int. Cl.$^4$ .................... B29C 51/06; B29C 51/08
[52] U.S. Cl. ............................ 264/550; 264/153; 264/292; 264/296; 264/322; 264/323; 425/292; 425/387.1; 425/400
[58] Field of Search .................... 264/549–551, 264/153, 292, 320, 322, 323; 425/292, 387.1, 398, 400

[56] References Cited

U.S. PATENT DOCUMENTS

| | | | |
|---|---|---|---|
| 3,184,524 | 5/1965 | Whiteford | 264/323 X |
| 3,487,139 | 12/1969 | Mojonnier et al. | 264/292 X |
| 3,584,109 | 6/1971 | Meadors et al. | 264/323 X |
| 3,726,953 | 4/1973 | Jones et al. | 264/323 X |
| 3,757,718 | 9/1973 | Johnson | 264/323 X |
| 4,047,869 | 9/1977 | Mulvany, Jr. | 264/323 X |
| 4,225,553 | 9/1980 | Hirota et al. | 264/292 |
| 4,354,996 | 10/1982 | Nishiyama et al. | 264/323 X |
| 4,419,320 | 12/1983 | Perkins et al. | 264/323 X |
| 4,420,454 | 12/1983 | Kanaguchi et al. | 264/323 X |

FOREIGN PATENT DOCUMENTS 2046619 3/1971 France .................... 425/398

Primary Examiner—Jan Silbaugh
Attorney, Agent, or Firm—Jennifer R. Daunis

[57] ABSTRACT

An apparatus and method for producing articles by stretch-forming or pressure-forming of thermoplastics in the solid crystalline phase which permits forming from a billet of given thickness articles of greater wall thickness than would be formed by stretch-forming or pressure-forming the clamped billets.

5 Claims, 7 Drawing Figures

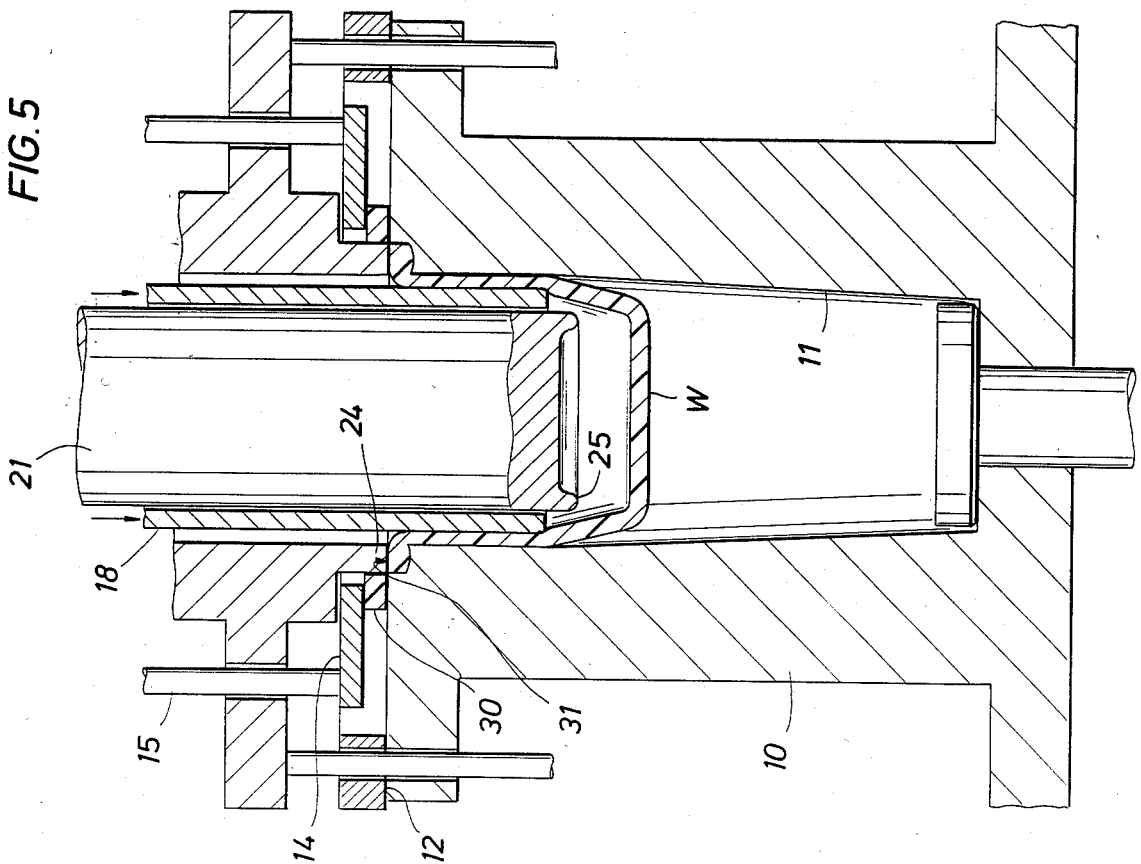
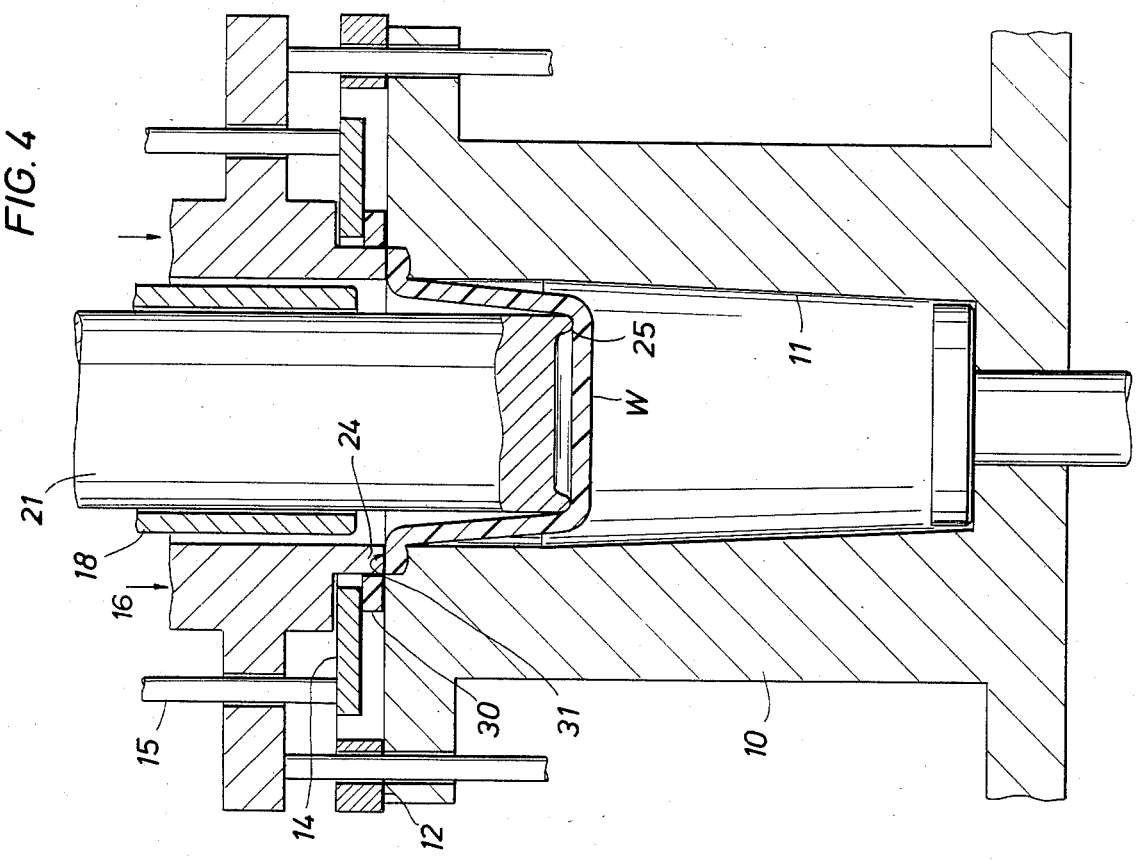

FORMING PLASTIC ARTICLES IN SOLID STATE

BACKGROUND OF THE INVENTION

This invention is directed to an improvement in a method for forming articles from thermoplastics in the solid state.

Hollow containers, such as cans, can be produced by a method in which the periphery of a billet—also referred to as "blank" or "preform"—of thermoplastic material which is orientable in the solid phase is clamped and the central, unclamped portion is gradually deformed while in the solid state by forcing a suitably shaped plunger down on it, resulting in plastic being drawn from under the plunger to form the sidewalls of the container as the plunger descends. The sidewalls of the resulting container are oriented in the direction of the draw. This method will herein be referred to as "stretch-forming". Stretch-forming methods and apparatus are described, i.a., in U.S. Pat. Nos. 3,499,188, 3,546,746 and 3,757,718 to Johnson and U.S. Pat. No. 3,606,958 to Coffman.

It has been found in such stretch-forming of predominantly crystalline thermoplastics in the solid phase that in depths of draw[1] up to about 1.25:1 there is a relatively constant ratio between the thickness of the original billet and the thickness of the sidewalls of the drawn article, regardless of the depth of draw. This observed thickness ratio is characteristic for each thermoplastic and corresponds approximately to the so-called "natural draw ratio"[2] of the material. In the case of polypropylene, for example, this ratio is about 6:1.

[1] Depth of draw refers to the ratio between the diameter or average length of side of the billet and the length of the drawing stroke in which the sidewalls are formed.
[2] The term "draw ratio" is ordinarily applied in the drawing of filaments and refers to the ratio of the final linear dimension after drawing to the original linear dimension. In the drawing of filaments, it is the ratio of denier of the filament after stretching to denier before stretching. Crystalline, substantially unoriented fibers, upon drawing in the solid state usually show a shoulder effect; the undrawn and drawn portions of such fibers are separated by a shoulder portion at which the fiber "necks down". The "natural draw ratio" is that draw ratio at which the entire fiber has been stretched to the reduced diameter which it naturally tends to assume. More generally expressed, the natural draw ratio is the draw ratio at the point in a stress-strain diagram where the tensile stress begins to rise sharply after the second or lower yield point, as defined in ASTM standard on Plastics, Appendix II, D628.

It is a consequence of this effect that articles having bottom and sidewalls of approximately equal thickness are formed by stretch-forming at a depth of draw of about 1.25:1. This happens to be a desired depth of draw for many articles. The method is therefore useful for forming many typical articles, such as cans and deep boxes.

Another consequence of the described effect is that it is not possible to produce, by stretch-forming, articles of substantial draw depth which have an average wall thickness substantially greater than about 1/5 or 1/6 of original billet thickness.

Another method of forming hollow containers is the method that has become known as "solid state pressure forming". This is described, for example, in U.K. Patent No. 1,367,338. A variant of the pressure-forming method, adapted to form non-circular articles, is described in U.S. Pat. No. 3,859,028.

The pressure-forming method comprises introducing a blank or sheet of thermoplastic material in the solid state between a forming plug and a mold having an end opening, clamping it into place, moving the forming plug into the mold opening with the blank to carry a bulged portion of the blank into the mold, and introducing pressure fluid into the bulged portion to form the article in the mold.

The solid phase pressure forming method is distinguished from stretch forming by the shape of the plug, which has a rounded bottom, so as to push the plastic blank into the female die without substantial stretch orientation. The method is currently in use for forming relatively thin-walled articles e.g., from sheets of as little as 0.25 mm, or greater, thickness, whereas stretch forming is particularly adapted for forming thicker-walled articles, e.g., from sheets or billets of as much as 20 mm, or greater, thickness. In the pressure-forming method the thickness of the side walls is a function of the thickness of the original blank and of the wall area of the formed article.

At times it may be desirable to provide by stretch forming or pressure forming articles having greater wall thickness without increasing the thickness of the billet from which the article is formed.

OBJECTS AND BRIEF DESCRIPTION OF THE INVENTON

It is a primary object of this invention to provide a method for producing articles by stretch-forming or pressure forming of thermoplastics in the solid crystalline phase which permits forming from a billet of given thickness articles of greater wall thickness than would be formed by stretch-forming or pressure forming the clamped billet. The solid crystalline phase refers herein to the condition of an at least partially crystalline thermoplastic material, such as isotactic polypropylene, at a temperature above the glass-transition point and below the crystalline melting point.

According to the invention, containers and similar hollow articles of controlled sidewall thickness are formed by employing a billet or blank of larger size than the area defined by the rim of the article to be made. The blank is placed in a blank holder which holds it loosely between the forming plunger—also called plug or male die—and the female die opening. As the plunger begins its descent, the blank is drawn inward from the blank holder. At a controlled depth of descent of the forming plunger, the periphery of the blank is gripped by a flange clamp and any excess is simultaneously sheared off. In cases where the drawing within the blank holder is uniform enough, the billet may be sized such that the perimeter may be gripped without the shearing action. This makes for a scrapless process. The forming process may then continue in known manner.

In the preferred mode, particularly in stretch-forming, an annular forming sleeve is then lowered between the forming plug and the inside wall of the female die; the annular clearance between the forming sleeve and the die wall is less than the thickness of the blank. This results in the upper portion of the sidewall of the article being conformed to the thickness of said clearance, the remaining plastic being forced down by a process known as ironing. The sleeve is lowered only part-way into the die, typically to about the same level to which the forming plunger has advanced. After the sleeve has been put in place, the forming plunger is lowered to complete forming of the article by stretch-forming.

BRIEF DESCRIPTION OF THE DRAWING

FIG. 4 is a view like FIG. 2, but with an annular trimming and blank-holding plunger descended on the rim of the blank;

FIG. 5 is a view like FIG. 2, but with an annular forming (ironing) sleeve descended partly into the die cavity.

DESCRIPTION OF THE INVENTION

Stretch-forming according to the invention can be practiced on apparatus such as shown in detail in the above-mentioned Johnson patents, modified as will be apparent from the following description.

Suitable apparatus comprises in combination (1) a female die unit having an open tubular portion defined by a cylindrical side wall; an upper flat surface adapted to support a sheet blank above said open tubular portion; and an annular, axially open-ended, peripherally confined blank-holding recess; (2) annular power-acutuated, axially movable blank holding means adapted to apply controlled pressure on top of a sheet blank and having a central opening greater than the outside circumference of said blank-holding recess; (3) annular, power-actuated, axially movable blank clamping means, the space between the blank seat and the clamping means being freely open inwardly for the full thickness of the rim to provide for holding the outer periphery of the blank rim against pull-in; and (4) an independently power-actuated, axially-movable forming plunger movable through the annular sidewall shaping and holding means and the tubular portion of the female die unit to force the inner portion of the rim-held blank into the die. Said blank clamping means may also act as a blank trimming means, adapted to trim that part of the blank outside the outer circumference of the blank-holding recess. Suitable apparatus may further comprise annular, power-actuated, axially movable sidewall-shaping and holding means concentric with the inside wall surface of the female die and defining an annular space therewith of the thickness less than the blank thickness, said means having a central opening to admit the forming plunger.

The forming plunger, the female die and the associated parts may be non-circular in cross section, for use in forming articles which are not circular in cross section. Accordingly, "annular" herein may refer to a non-circular open space between parts, such as the blank-holding recess, or to a non-circular part such as the blank-holding or blank-clamping means.

Figure 1:
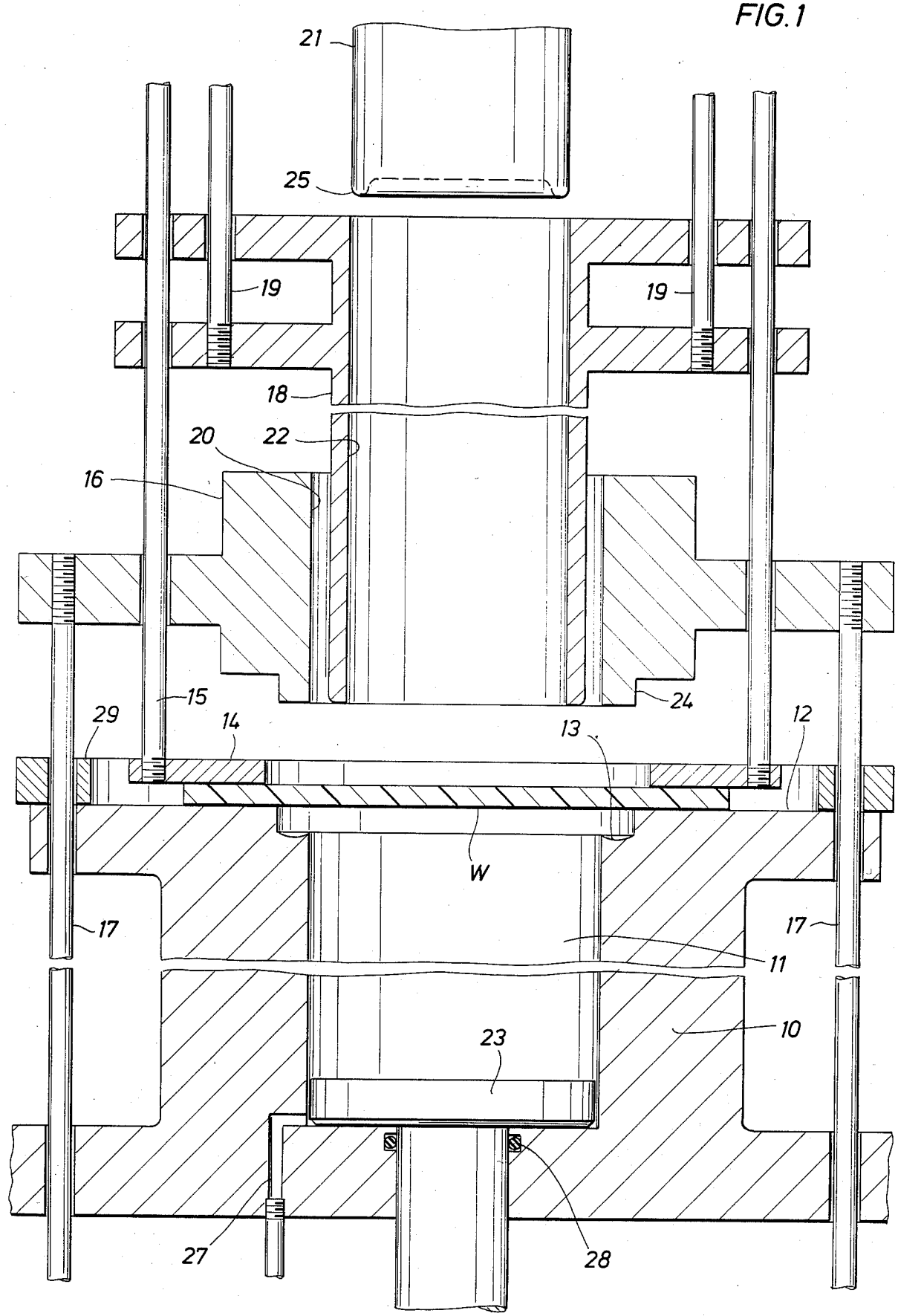
FIG. 1 is an axial section through one form of press apparatus embodying the invention, the parts being shown in retracted position with a sheet blank or billet introduced.

Referring to FIG. 1 a forming press comprises a female die unit 10 having a cavity or chamber 11, an upper blank supporting surface 12 for supporting a blank or billet W at the beginning of the forming cycle, and a recessed annular seat 13 for clamping the blank during a later stage of the forming cycle. An annular blank holder 14 is adapted to be placed on the blank; it should exert sufficient force to keep the blank from wrinkling but not enough to keep the blank from being drawn into the female die by the forming plunger. It is suitably mounted on support rods 15 which permit it to be raised or lowered and to apply downward force by means not shown. An annular rim-clamping and trimming plunger 16 is suitably mounted, as on guide rods 17, to trim excess plastic from the blank and to clamp the annular outer edge or rim of the blank upon the recessed annular seat 13. Its inner diameter is the same or about the same as that of the opening of female die cavity 11. An annular forming sleeve plunger 18, suitably mounted on guide rods 19, is arranged to move through the inner cylindrical opening 20 of the annular rim-clamping plunger 16 and into die cavity 11. Its outer diameter is less than the inner diameter of die cavity 11 by a predetermined amount less than the thickness of the blank.

A forming plunger 21 is arranged to move through the inner cylindrical opening 22 of the annular sleeve 18 to engage the interior portion of the blank W.

An article ejection plunger 23 is slideably mounted in the die chamber and, if desired, may be raised to engage the lower surface of the blank at the start of the forming operation. However, the upward pressure of the ejection plunger is relatively very slight so that it will have substantially no compression effect on the free outward flow of the blank material from beneath the forming plunger.

When rim clamping plunger 16 descends into position, it shears off any excess plastic by the die cutting action of edge 24, and engages the remaining outer edge of the blank with sufficient axial pressure to hold it securely against pulling out as the article is formed; it may leave the rim at different thicknesses as desired, from substantially the full thickness of the original blank down to a very thin rim. Stops 29 of any suitable selected replaceable nature may be provided for limiting the downward movement of the clamping plunger, herein the stop means being shown as insertable washers of selectable thickness. The annular sleeve plunger 18 is adapted to descend partway into the female die after rim clamping plunger 16 has descended into place and forming plunger 21 has descended partway. Since the annular clearance between die 10 and sleeve 18 is less than the original thickness of the blank, the descent of the sleeve serves to press some of the plastic of the blank down below the tip of the sleeve, thus reducing the wall thickness by a method designated herein as "ironing".

The pull-out of material from beneath the forming plunger is affected by (a) the temperature and composition of the material itself; (b) the rate of advance of the forming plunger; (c) the temperature of the forming plunger; (d) its shape; and (e) the relative friction between the end of the forming plunger and the billet material.

The plunger 23 shown herein is of a low friction forming material and has a rounded outer edge 25 for the easy flow of material. A fluorocarbon polymer coated plunger end may be desirable. Fluids having a lubricating effect may be used. Fluid may be supplied beneath the blank in the forming space past the ejection plunger, as by a chamber duct 27, a retaining O-ring seal 28 being provided around the stem of the ejection plunger. There is available on the market an oxide-coated and PTFE impregnated material which has a very low co-efficient of friction and is satisfactory for use in the present apparatus and method.

Steps in the production of articles by stretch-forming according to this invention are illustrated in FIGS. 2-6. Corresponding parts of FIGS. 2-6 are numbered as in FIG. 1.

Figure 2:
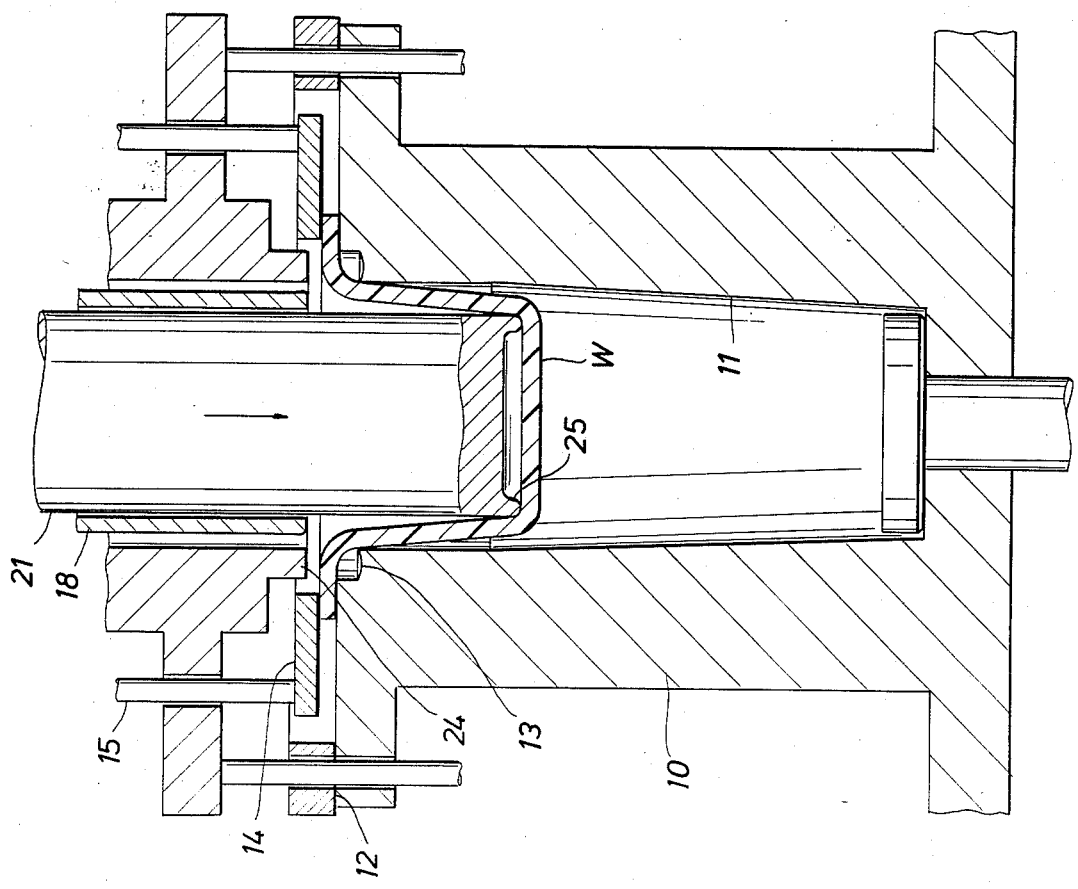
FIG. 2 is a simplified sectional view in elevation of parts of the apparatus of FIG. 1 with a billet in position for stretch-forming.

FIG. 2 is a schematic drawing of the apparatus of FIG. 1 at the same stage of the process, i.e., after a blank has been placed on the supporting surface 12 of female die unit 10, and blank holder 14 has descended to rest on the top surface of the blank.

Figure 3:
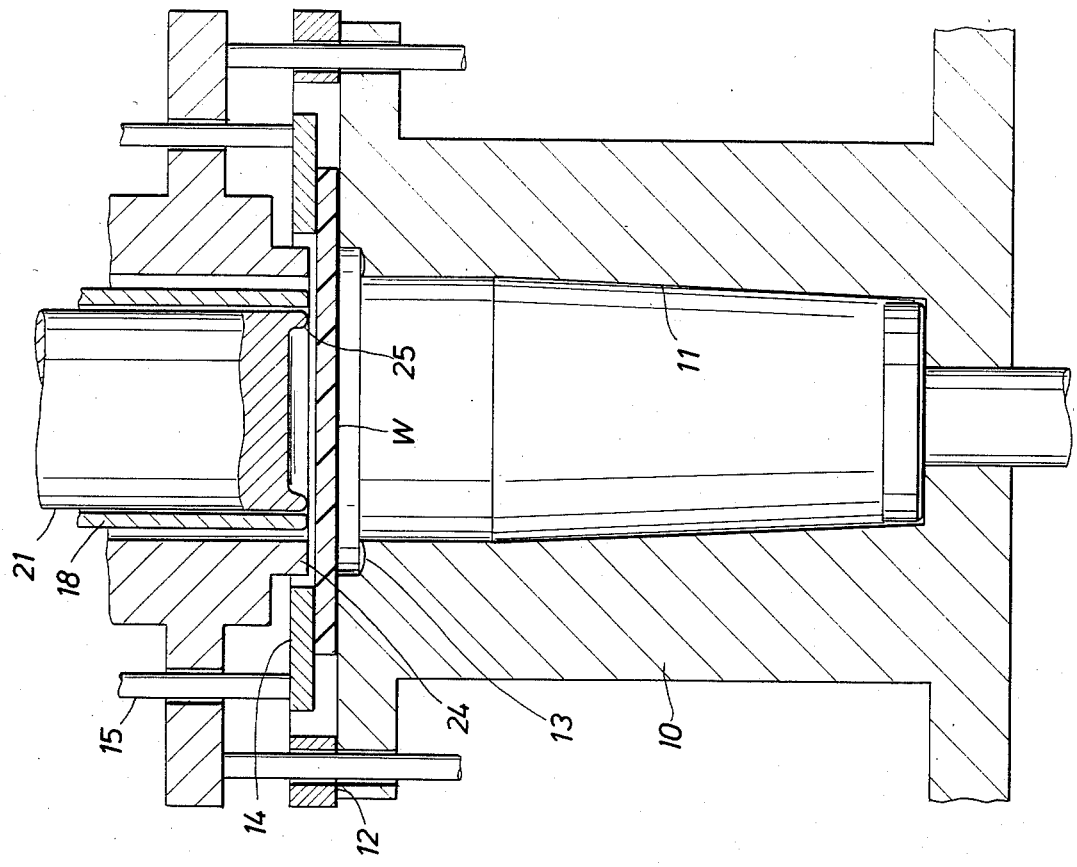
FIG. 3 is a view like FIG. 2 but with an annular stretch-forming plunger partially descended.

FIG. 3 shows forming plunger 21 partly descended. Since the blank is loosely held between surface 12 and blank holder 14, its outer edge has been drawn inward, and the thickness of the blank is substantially unchanged. At this stage, the forming plunger is stopped until clamping plunger 16 and annular forming sleeve 18 have been put in place.

FIG. 4 shows rim clamping and trimming plunger 16 in its fully descended position. The trimmed-off outer rim 30 of the blank becomes scrap, to be removed later. As previously noted, the trimming may be unneccessary in some cases. Bottom edge 31 of the plunger now holds the remaining rim of the blank firmly in place.

FIG. 5 shows the annular sleeve plunger in its fully descended position. It has thinned some of the upper portion of the blank by ironing to conform to the annular space between the female die surface and the outer wall of the sleeve.

Figure 6:
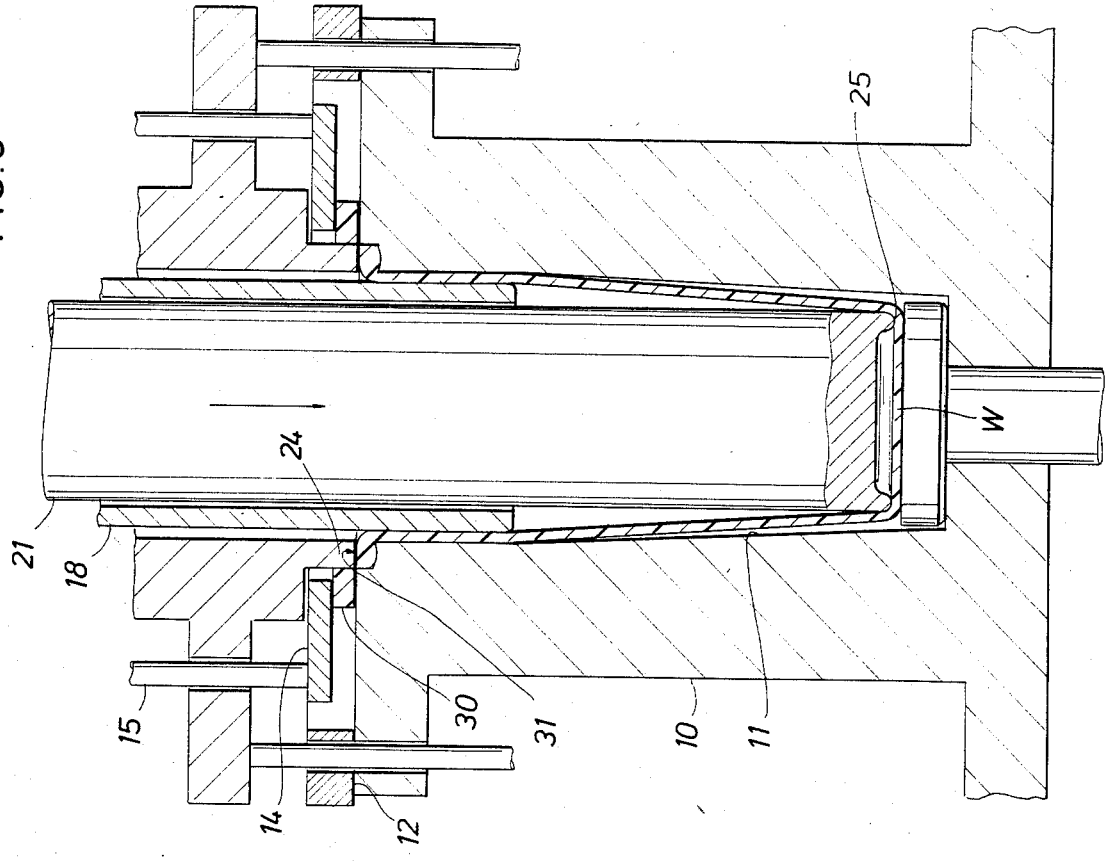
FIG. 6 is a view like FIG. 2 but showing the article, in fully formed condition.

FIG. 6 shows forming plunger 21 in its fully descended position and shows the shape of the completed article, formed by stretch-forming between the positions of FIGS. 5 and 6.

At the completion of the plunger stroke, the plunger is withdrawn and the formed article is ejected by suitable means, not shown in FIGS. 2-6. This may, for example, comprise ejection ram, 23, shown in FIG. 1 or a fluid pressure pulse, or a split die.

Suitable apparatus for pressure-forming according to the invention comprises in combination (1) a female die unit having an open tubular portion defined by a cylindrical side wall; an upper flat surface adapted to support a sheet blank above said open tubular portion; and an annular, axially open-ended, peripherally confined blank-holding recess; (2) annular power-acutated, axially movable blank holding means adapted to apply controlled pressure on top of a sheet blank and having a central opening greater than the outside circumference of said blank-holding recess; (3) annular, power-actuated, axially movable blank clamping means, the space between the blank seat and the clamping means being freely open inwardly for the full thickness of the rim to provide for holding the outer periphery of the blank rim against pull-in; (4) an independently power-actuated, axially-movable forming plunger movable through the annular sidewall shaping and holding means and the tubular portion of the female die unit to force the inner portion of the rimheld blank into the die, and to form a pressure tight seal against said clamping means; fluid passages inside said forming plunger, opening at the outer surface of the plunger and adapted to admit fluid between said outer surface and said blank; and fluid passages adapted to vent trapped air from said female die unit. Said blank clamping means may also act as a blank trimming means, adapted to trim that part of the blank outside the outer circumference of the blank-holding recess.

The forming plunger, the female die and the associated parts may be noncircular in cross section, for use in forming articles which are not circular in cross section.

Figure 7:
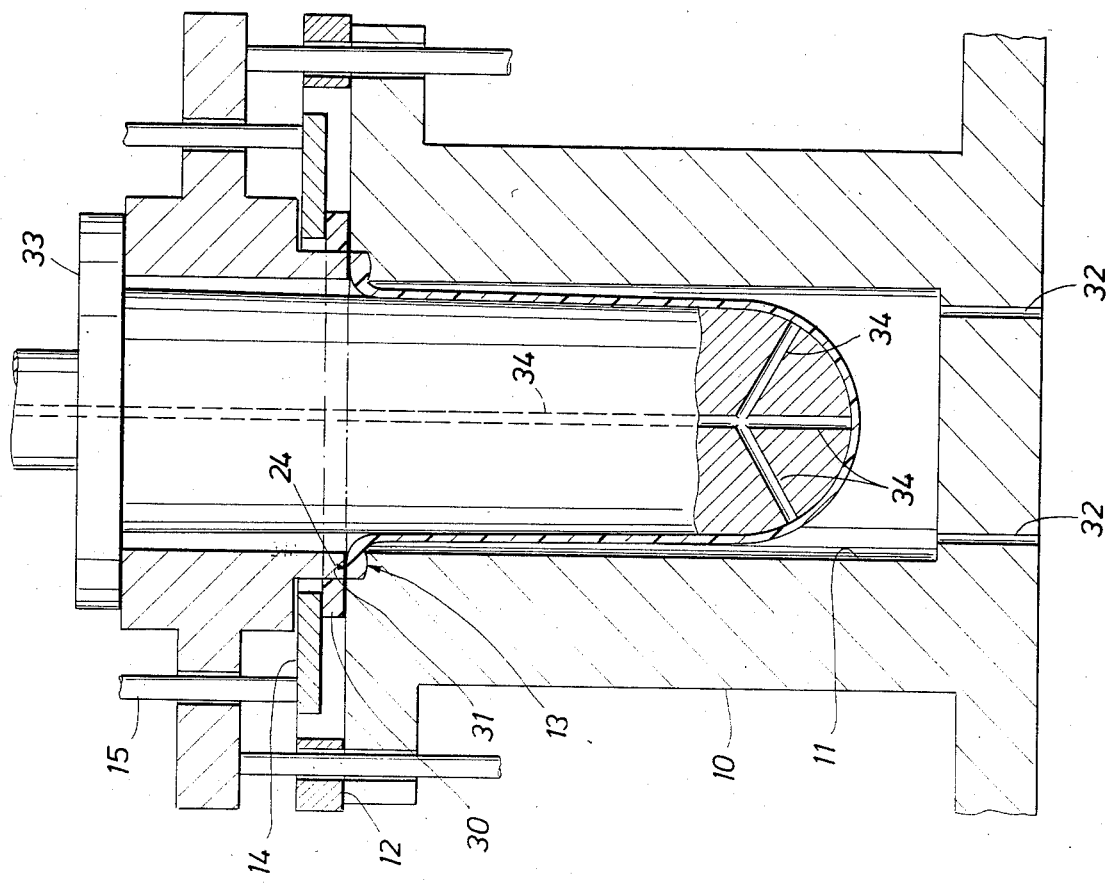
FIG. 7 is a simplified sectional view in elevation of parts of an apparatus suitable for practicing the invention by pressure-forming, the parts being shown at the end of the travel of the forming plunger.

Apparatus adapted to perform this invention in the pressure forming mode is illustrated schematically in FIG. 7, which shows the forming plunger at the bottom of its cycle, just prior to introduction of air for the final shaping step. Corresponding parts are numbered as in FIGS. 1-6. This apparatus is modified from that of FIGS. 1-6 in that ironing sleeve 18 is omitted—although such a sleeve may be used in pressure forming, if desired.

In applying the method of this invention to pressure forming, the bottom of forming plunger 21 is rounded. At the end of the forming stroke, plunger 21 remains somewhat above the bottom of the female die. The female die is the exact shape of the desired article. Fluid pressure, suitably compressed air at about 7 bars, is then blown through air ducts 34 in the plug to press the sheet, previously pushed into the die cavity by the plug, against the walls of the die, the air between the sheet and the die walls being driven out through vent ports 32.

It is also possible to combine stretch-forming with a subsequent pressure-forming step to produce a strongly oriented article which has a shape other than that inherent in drawing the walls from the reservoir under a plug shaped to permit stretch-forming.

Numerous modifications may be made in the apparatus of FIGS. 1 and 2-7 and in the illustrated method, as will be evident to persons skilled in the art. The illustration of the apparatus is simplified by not showing a number of obviously necessary as well as ordinarily desirable features especially in FIGS. 2-7, such as temperature control means, fluid passages, and the like, which are not essential for illustration of the present invention, and other obvious features such as means for moving and guiding rim-plunger 16 and forming plunger 21, means for ejecting the formed article, and the like.

The method of this invention is applicable in general to thermoplastic materials which normally exist in crystalline or partially crystalline form. These materials are characterized by a tensile stress-strain curve which shows a reduction of tensile stress immediately following the first yield point, a drop in tensile stress to the second yield point, and a subsequent rise in tensile stress substantially above the first yield point. Such polymers are characteristically employed for use as textile fibers and are characterized by the draw-down or necking effect which results in a thinning of an article, such as a fiber, upon drawing in the solid state to the reduction in area which is characteristic of the polymer. Such polymers are, for example, commercial prevailingly isotactic polypropylene, high density polyethylene, polyamides (nylon), polyesters, and the like. The invention is particularly advantageous for use with polyolefins such as isotactic polypropylene, polypropylene modified for impact improvement, including socalled block copolymers with other olefins, and high density polyethylene.

Stretch-forming or pressure-forming in accordance with this invention is carried out at a temperature at which the polymer exists in the solid state in at least partially crystalline phase i.e., above its glass transition point and below the crystal melting point of crystalline polymer. It is generally desirable to form polymer at an elevated temperature, provided it is substantially below the crystalline melting point, e.g., 3° C. or more below said melting point. It is essential that the polymer remain in the solid state in order to achieve the desired orientation effect. Illustrative of suitable temperatures for polypropylene is the range from 15° to 166° C., a preferred range being from 140°–166° C.

In pressure forming, air is a suitable fluid. Air pressures in the range from about 5.5 to about 35 bars gauge may be employed. A pressure of about 7 bars is usually satisfactory. Blank thicknesses may vary from 0.25 mm to 20 mm or more. The process may employ as blank sheets, or billets cut from sheets, or billets formed by other methods.

The blank W may be formed of a single homogeneous thickness of material or may consist of laminate of the same or different kinds of material, either integral or laminar, or of laminae of different materials selected for the desired characteristics of the container.

What is claimed is:

1. The method of forming an integral hollow article having a bottom and contiguous side walls which comprises (1) placing a solid-state deformable thermoplastic blank of larger size than the area defined by the rim of the article, at a forming temperature below its crytalline melting point, above the opening of the female die; (2) holding said blank loosely in place; (3) forcing a forming plunger down on said blank to only a part of the depth of the final draw to pull said blank partly into a die cavity; (4) forcing a rim holding plunger down to push to the rim of said blank into a recessed annular seat and clamp it into place; and (5) forcing said forming plunger, adapted to stretch-form the blank, completely down into the die cavity to achieve full depth of the final draw, so that the portion of said blank which was outside the area defined by said rim of said hollow article is incorporated in said wall of said hollow article thus increasing the thickness of said wall of said hollow article.

2. The method of claim 1 wherein said rim holding plunger, when descending, simultaneously pushes the rim of said blank into recessed annular seat and clamps it into place and trims off that part of the blank outside said recessed annular seat.

3. The method of claim 1 wherein a wall-forming and holding annular sleeve is forced down between the forming plunger and the blank to thin the upper part of the sidewall of the article after the rim holding plunger has moved into place.

4. The method of forming an integral hollow article having a bottom and contiguous side walls which comprises (1) placing a solid-state deformable thermoplastic blank of larger size than the area defined by the rim of the article, at a forming temperature below its crystalline melting point, above the opening of the female die; (2) holding it loosely in place; (3) forcing a forming plunger down on said blank to only a part of the depth of the final draw to pull said blank partly into a die cavity; (4) forcing a rim holding plunger down to push the rim of said blank into a recessed annular seat and clamp it into place; and (5) forcing said forming plunger, having a rounded bottom adapted to deform said blank without drawing the plastic across an edge, completely down into said die cavity to achieve full depth of the final draw, while the same time forcing fluid out between the outer surface of said forming plunger and said blank under sufficient pressure to cause said blank to conform to the shape of said female die, so that the portion of said blank which was outside the area defined by said rim of said hollow article is incorporated into said wall of said hollow article, thus increasing the thickness of said wall of said hollow article.

5. The method of claim 4 wherein said rim holding plunger, when descending, simultaneously pushes the rim of the blank into said recessed annular seat and clamps it into place and trims off that part of the blank outside said recessed annular seat.

* * * * *